March 24, 1936. L. D. SOUBIER 2,034,844
MACHINE FOR FORMING HOLLOW GLASS ARTICLES
Filed May 18, 1934 8 Sheets-Sheet 1
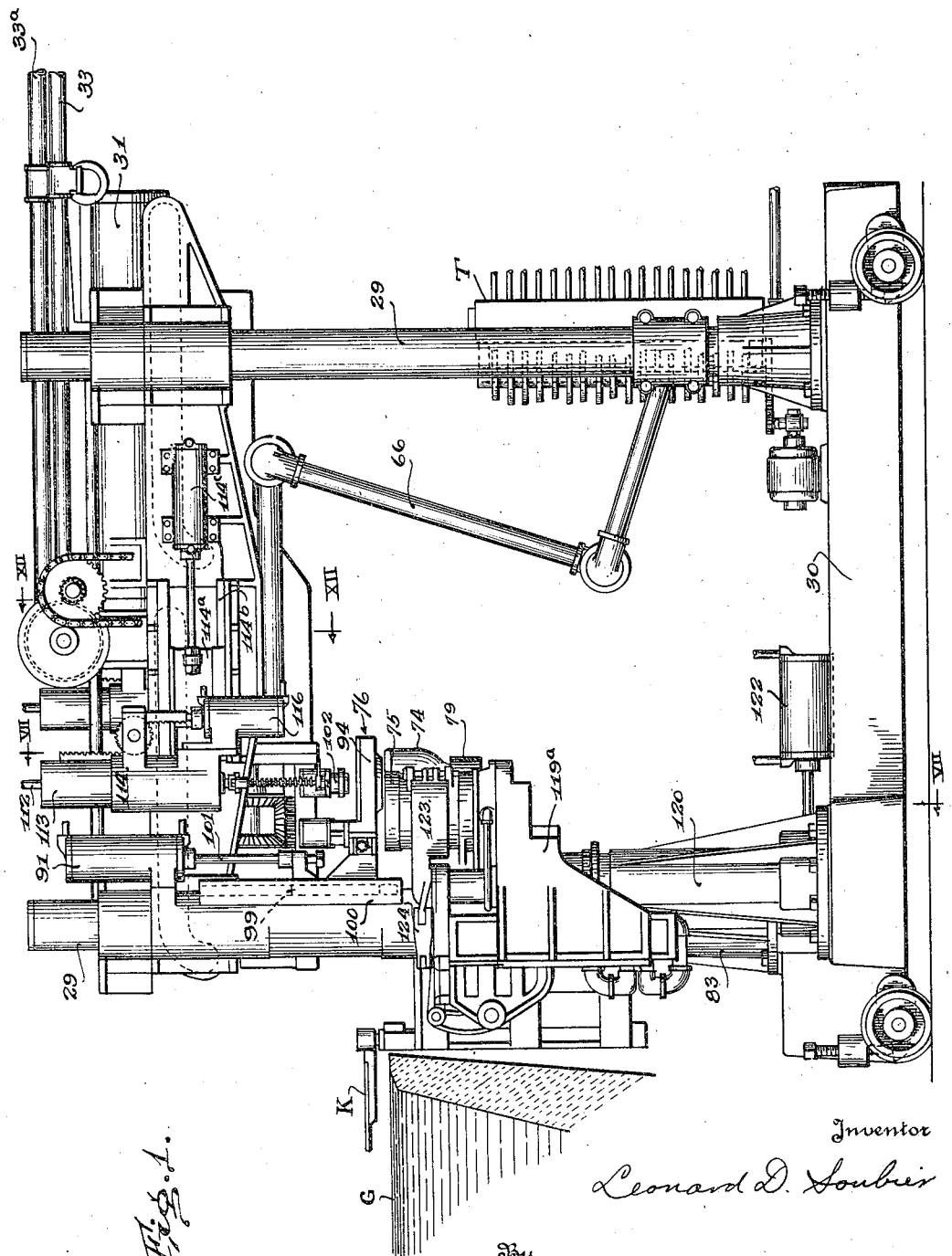

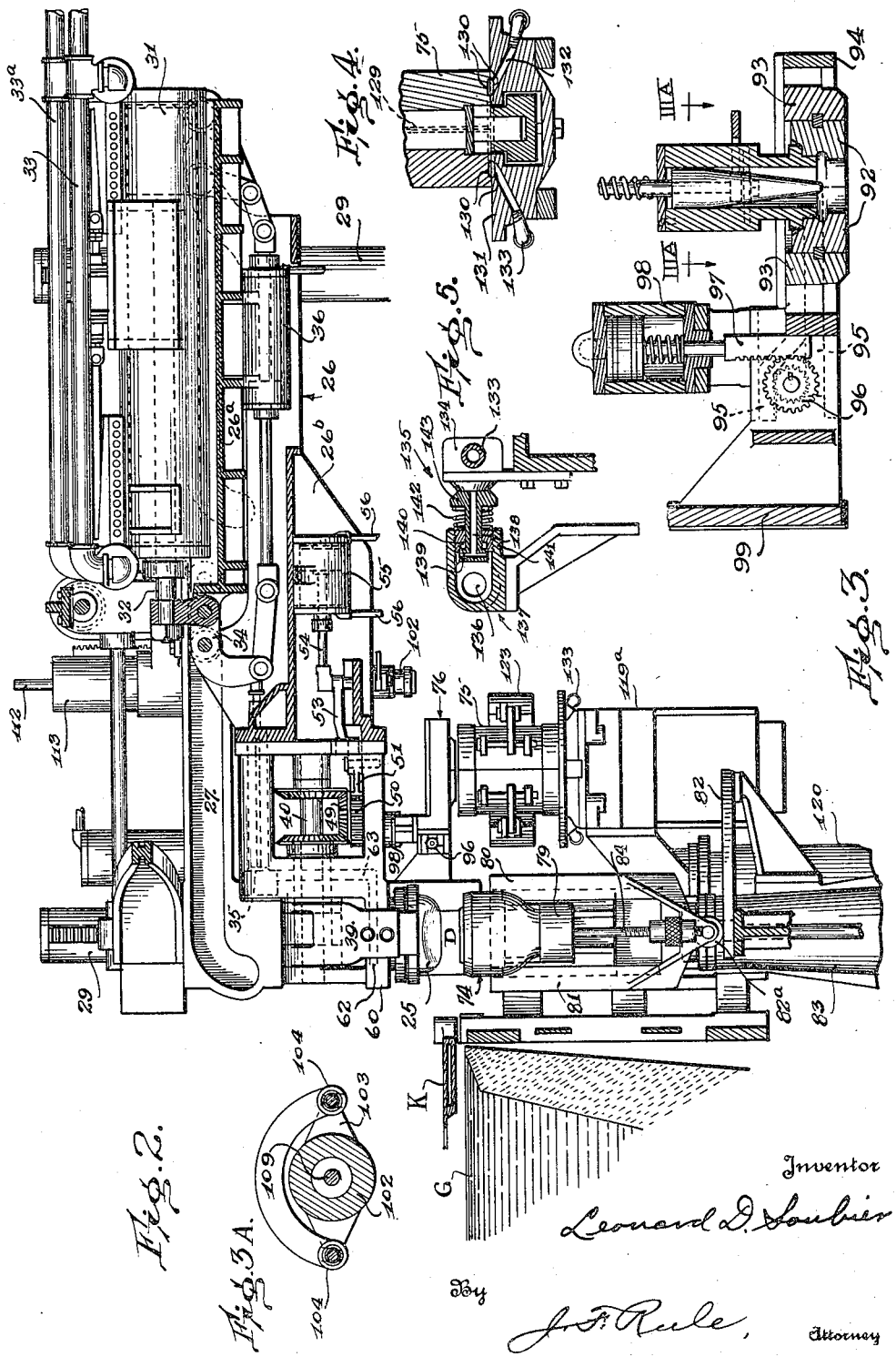

March 24, 1936.  L. D. SOUBIER  2,034,844
MACHINE FOR FORMING HOLLOW GLASS ARTICLES
Filed May 18, 1934   8 Sheets-Sheet 3

Inventor
Leonard D. Soubier
By J. F. Rule,
Attorney

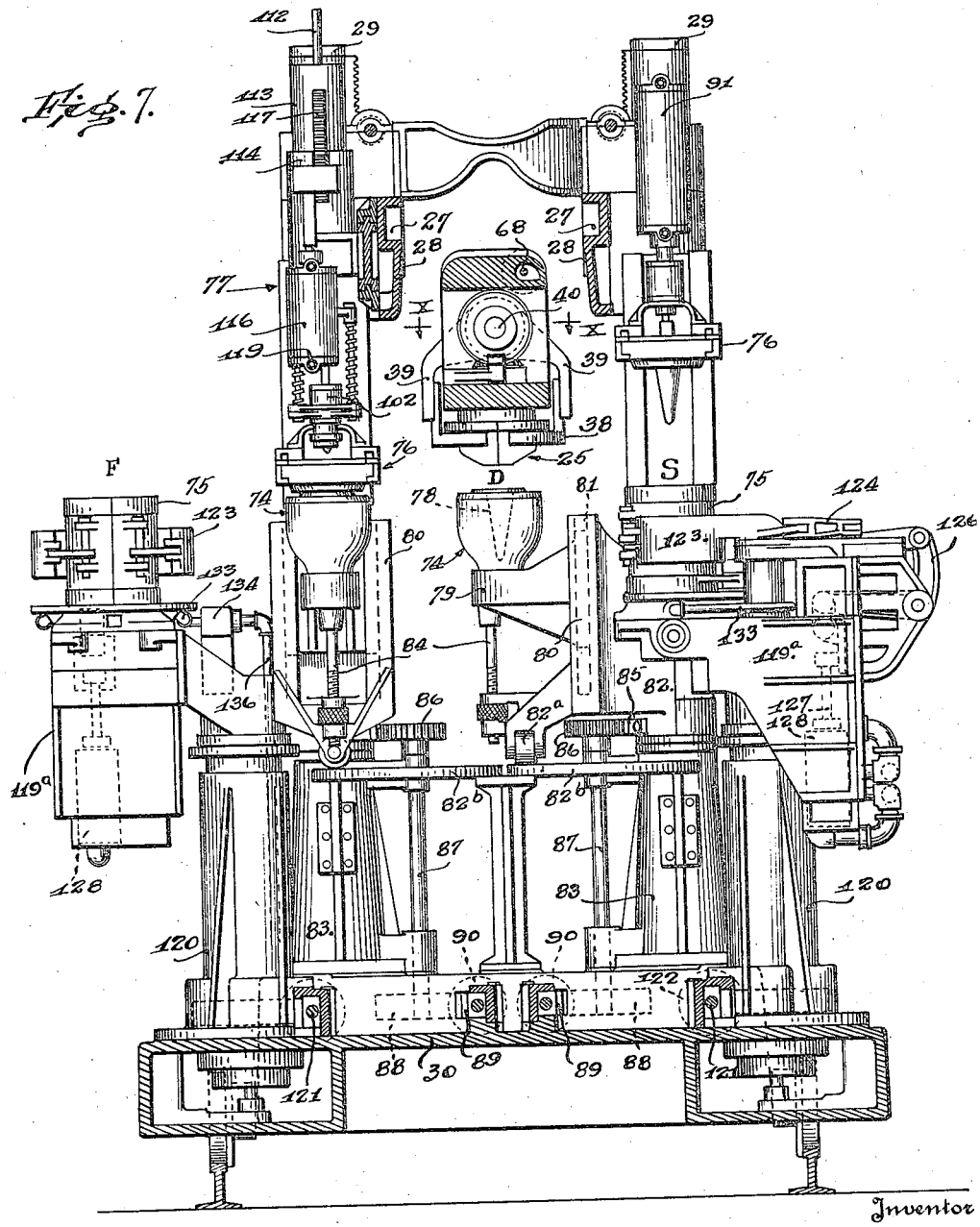

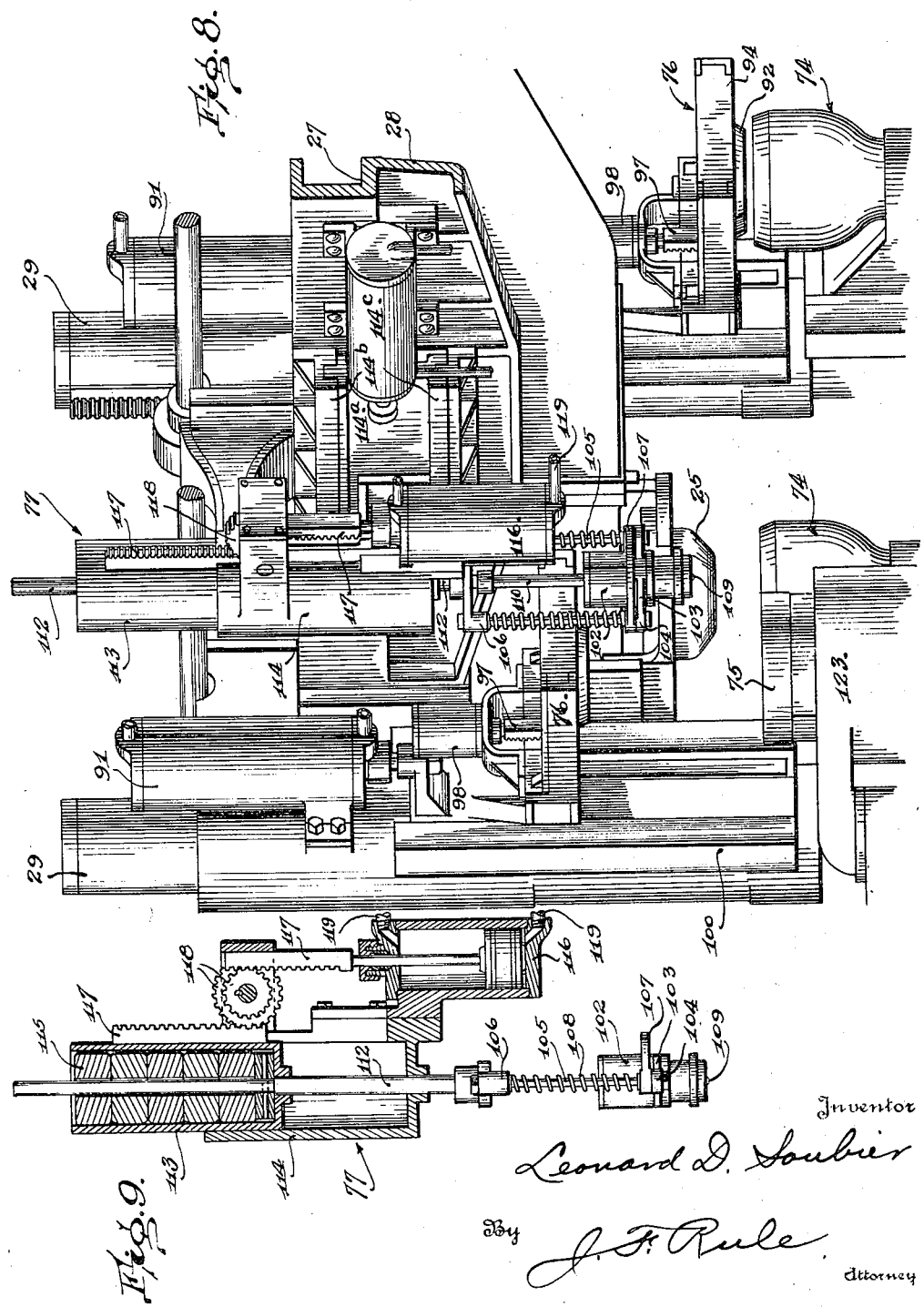

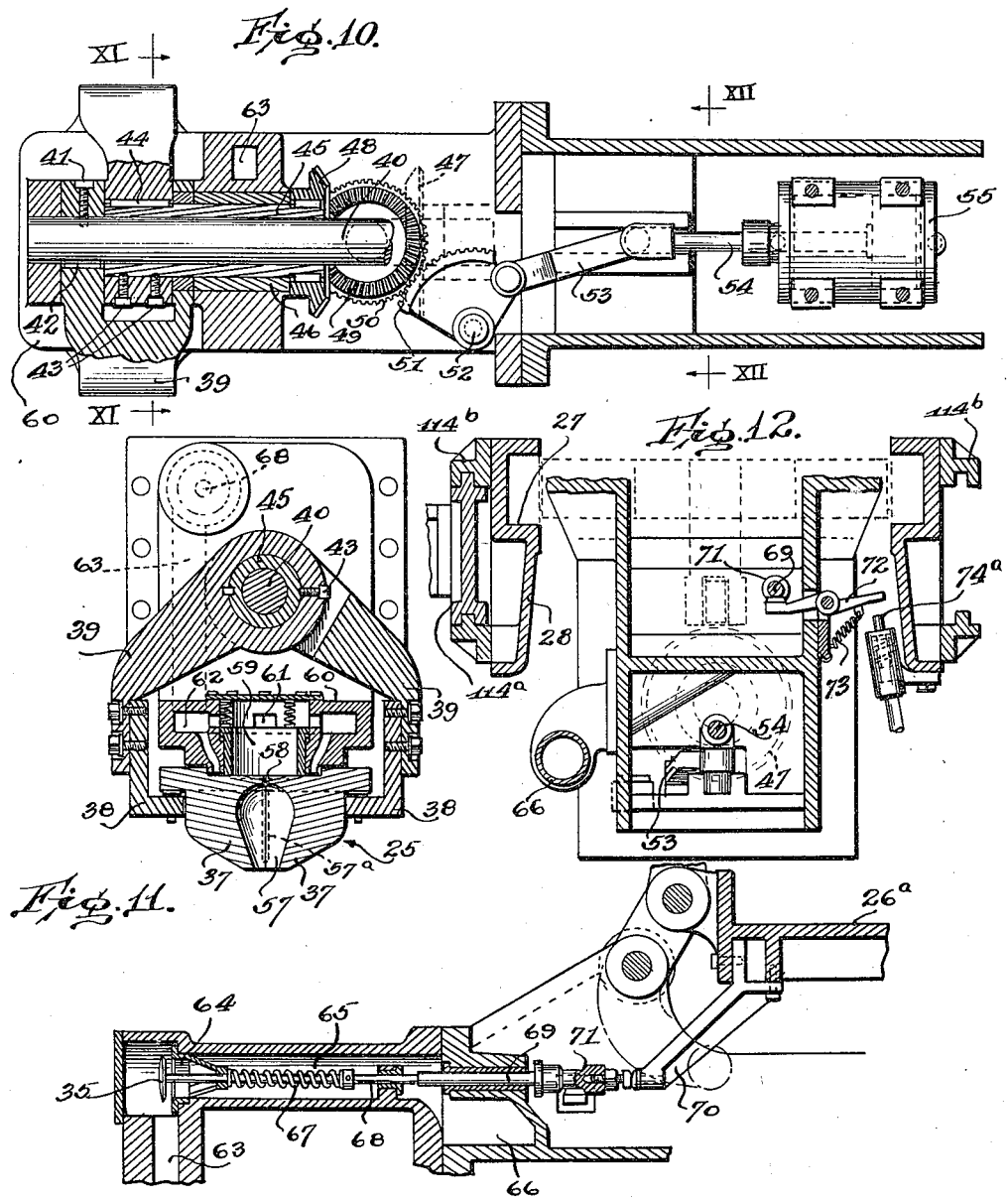

March 24, 1936.  L. D. SOUBIER  2,034,844

MACHINE FOR FORMING HOLLOW GLASS ARTICLES

Filed May 18, 1934　　8 Sheets-Sheet 7

Inventor
Leonard D. Soubier
By J. F. Rule, Attorney

Inventor
Leonard D. Soubier
By J. F. Rule
Attorney

Patented Mar. 24, 1936

2,034,844

UNITED STATES PATENT OFFICE 2,034,844

MACHINE FOR FORMING HOLLOW GLASS ARTICLES

Leonard D. Soubier, Toledo, Ohio, assignor to Owens-Illinois Glass Company, a corporation of Ohio Application May 18, 1934, Serial No. 726,350

14 Claims. (Cl. 49—9)

The present invention relates to improvements in machines for forming hollow glass articles such for example as jars and the like containers, and is particularly concerned with that type of machine in which the blank or parison forming operation involves the use of a pressing plunger.

An object of the present invention is the provision of a comparatively small compact machine in which a single charge gathering unit functions to gather and deliver mold charges to a plurality of press blank molds.

Another object is the provision in a machine of the above character of means whereby the necessary extent of movement of the blanks or parisons during the fabricating operations is materially reduced. To this end the mold charge is deposited in a press blank mold which is then moved to a combined pressing and transferring station. Here a neck mold and pressing plunger are brought into operation with the result that the blank is attached to the neck mold. Thereafter by relative vertical and horizontal movement between the press blank mold and neck mold the blank is removed from the former and a finishing mold is brought into register with the neck mold and closed about the blank preparatory to the final blowing or expanding operation. Thus the blank is not subjected to excessive horizontal movements and consequent bending and distortion of the neck portions is avoided.

A further object is the provision in a machine of the above character of a novel press plunger unit in which the pressure applied to the mold charge may be regulably controlled to meet the specific requirements of the glass and article being produced.

Other objects will be in part apparent and in part pointed out hereinafter.

In the accompanying drawings:

Fig. 1 is a side elevational view of a machine embodying the present invention.

Fig. 2 is a fragmentary detail elevational view with parts in section.

Fig. 3 is a detail sectional elevational view of the neck mold and its operating mechanism.

Fig. 3A is a sectional plan view taken along the line III-A—III-A of Fig. 3.

Fig. 4 is a fragmentary vertical sectional view through one of the finishing mold units showing the vacuum connection thereto.

Fig. 5 is a sectional elevational view showing the separable vacuum connection between one of the oscillating finishing mold units and the vacuum supply pipe.

Fig. 7 is a sectional elevational view taken substantially along the line VII—VII of Figs. 1 and 6.

Fig. 8 is a sectional elevational view taken substantially along the line VIII—VIII of Fig. 6 showing one of the neck mold units in register with the corresponding press blank mold.

Fig. 9 is a sectional view taken substantially along the line IX—IX of Fig. 6.

Fig. 10 is a sectional plan view taken substantially along the line X—X of Fig. 7.

Fig. 11 is a sectional view taken along the line XI—XI of Fig. 10.

Fig. 12 is a fragmentary vertical sectional view taken substantially along the line XII—XII of Figs. 1 and 10, certain parts being omitted for the sake of clearness.

Fig. 13 is a sectional elevational view illustrating the means for regulating the application of vacuum to the gathering mold.

Figure 14:
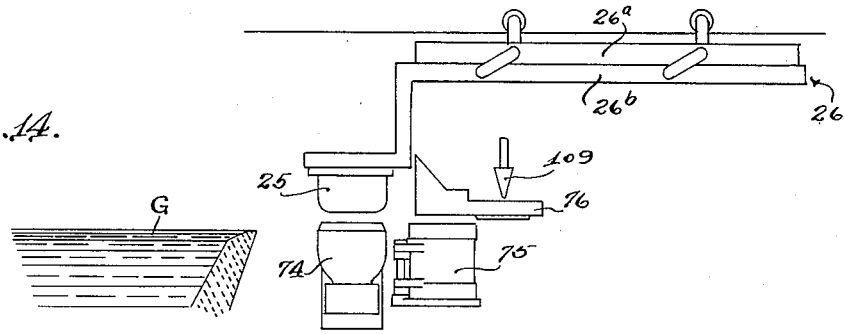
Figure 15:
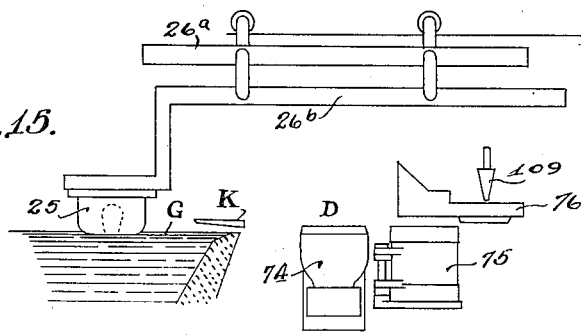
Figure 16:
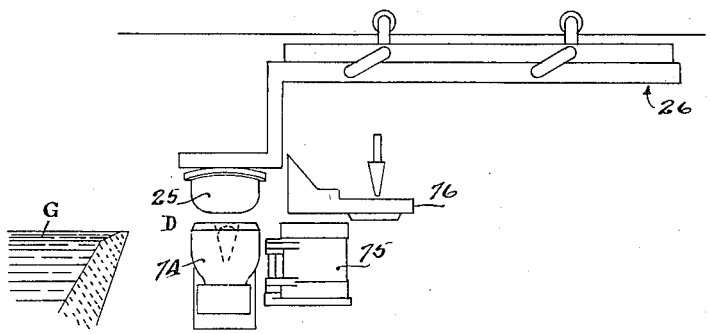
Figure 17:
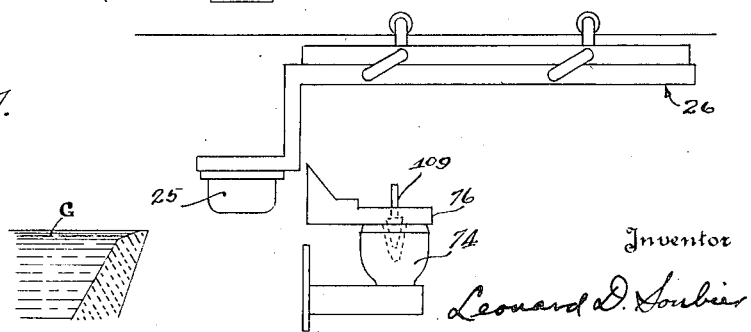
Figure 18:
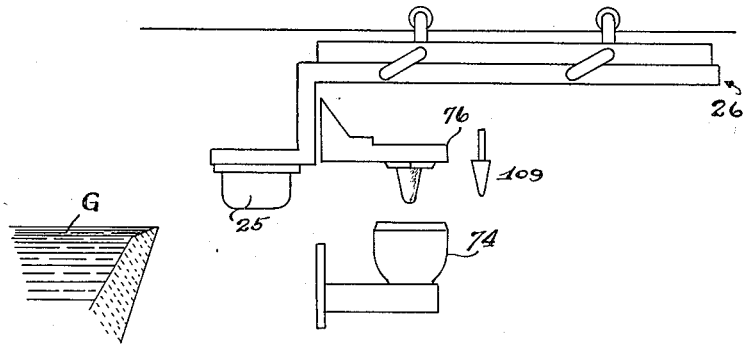
Figure 19:
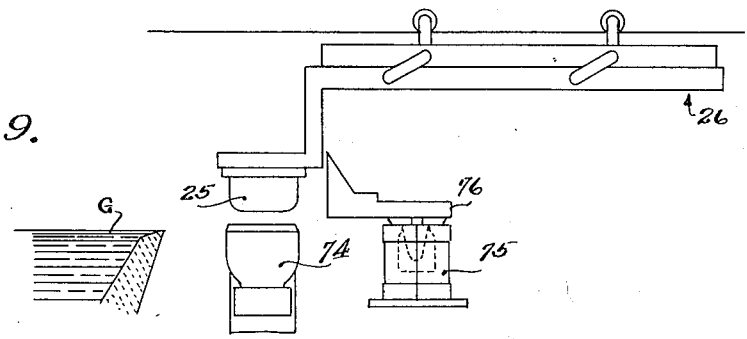
Figure 20:
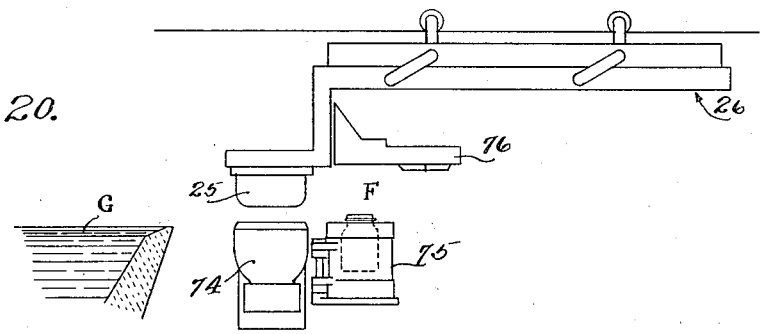

Figs. 14 to 20 illustrate more or less diagrammatically the successive relative positions of the mold units in a single cycle of operations. Fig. 14 shows the gathering mold about to be projected to its charge gathering position. Fig. 15 shows the gathering mold in contact with the molten glass. Fig. 16 shows the gathering mold in register with the press blank mold at the time the mold charge is deposited into the latter. Fig. 17 shows the neck and press blank molds in register and the plunger in compacting position. Fig. 18 shows the neck mold and blank suspended therefrom in raised position preparatory to removing the press blank mold and bringing the finishing mold into register with the neck mold. Fig. 19 shows the neck mold lowered and the finishing mold closed about the blank. Fig. 20 shows the finishing mold with the completed article therein at the article removing station.

In more or less general terms the present invention as embodied in the illustrated machine includes a partible cup-like gathering mold common to several press blank and finishing molds which are disposed at a common level, said gathering mold obtaining its mold charges by suction from a stationary gathering pot or container, and at a charge station opening to deposit a mold charge in one of the press blank molds. This press blank mold moves away from the charging station to a combined press- and blank transferring station into register with superposed press plunger and neck mold units, the latter first being lowered into engagement with the blank mold and followed immediately thereafter by lowering of the press plunger which operates to compact the mold charge and force portions thereof into the neck mold. This latter effects supporting engagement between the neck mold and mold charge which by this time has assumed the form of the blank or parison. The press plunger is then raised and followed by upward movement of the neck mold unit which carries the blank with it. The press blank mold is then moved out of register with the neck mold and its place beneath the neck mold is immediately occupied by a finishing mold which closes around the blank. The neck mold is then opened and the finishing mold moved to the article removing station. After the finishing mold has reached the article removing station, vacuum or any other preferred medium may be employed in expanding the blank to the final form. The finishing mold is then opened and the finished article removed therefrom.

As illustrated, the machine embodying my invention consists of a charge gathering mold 25 Figs. 2, 8, 11 and 14 to 20) suspended from one end of a ram 26 or mold carrier which is mounted for horizontal reciprocation in tracks 27 provided on the inner vertical faces of a pair of parallel girders 28 whereby said mold is alternately placed in contact with the supply body of molten glass "G" and a charge delivery station "D". These girders are mounted for vertical adjustment upon four corner posts 29 of a main frame, said corner posts rising from a wheeled base 30 which also supports other mold units as will appear hereinafter and a timer "T", the latter being of conventional or any preferred form and designed to regulably control the various fabricating operations. Reciprocation of the mold carrier 26 is obtained by means of an air operated piston motor 31 (Fig. 2), the piston rod 32 of which is connected to the upper section 26ª of said mold carrier. Air under pressure is supplied to this motor through a pipe 33 and exhausted therefrom through a pipe 33ª. The lower section 26ᵇ of the mold carrier which is connected to the upper section by links 34 as in the Soubier application, Serial No. 663,721, filed March 31, 1933, is adapted to move downwardly away from the upper section substantially at the time it reaches its fully projected position for the purpose of bringing the gathering mold 25 into contact with the molten glass and at the same time open a vacuum control valve 35. A counterbalancing device including an air operated piston motor 36 is mounted immediately below the upper section 26ª of the mold carrier 26 (Fig. 2) to assist in initial lifting of the gathering mold out of contact with the glass, as in said Soubier application. This gathering mold 25 (Figs. 7 and 11) includes a pair of sections 37 suitaby mounted in a pair of holders 38 at the free ends of a pair of arms 39, said arms being mounted for oscillation about the axis of a horizontal shaft 40 extending in the direction of the length of the ram 26. Opening and closing of this gathering mold in alternation is obtained by rocking the arms 39, one of which is secured by a screw 41 and key 42 to said shaft 40. The other arm is attached by means of screws 43 and a key 44 to a sleeve 45 which surrounds a portion of said shaft and is journaled in a bearing 46. The shaft 40 (Figs. 1, 2 and 10) extends beyond the inner end of the sleeve 45 and carries a bevel gear 47 which faces a bevel gear 48 on the adjacent end of the sleeve 45. Both of these gears mesh with a bevel gear 49 at diametrically opposite points, the latter bevel gear being disposed below the shaft 40 and rotatively connected to a spur gear 50. A sector gear 51 engaging this spur gear is pivoted to a vertical hinge pin 52 and connected through a link 53 to the piston rod 54 of an air operated piston motor 55, air under pressure being supplied to the opposite ends of this motor through pipes 56. Controlled operation of this piston motor 55 alternately opens and closes the gathering mold 25 in timed relation to operation of the other units of the machine. Such controlled operation as indicated heretofore is obtained by means of the timer "T".

This gathering mold 25 is provided with a downwardly opening cavity 57, in the upper wall of which is a vacuum port 58 which establishes communication between said cavity and a vacuum chamber 59. Vacuum slots 57ª may be formed in the meeting faces of the mold sections to facilitate application of vacuum to the cavity as in the suction gathering molds of the well known Owens type machine. This chamber 59 is formed in an adapter head 60 at the front end of the ram and communicates by way of an annular series of ports 61 with an annular chamber 62 connected to the lower end of a vertical conduit 63 leading to a valved opening 64 which is normally closed by the vacuum valve 35 referred to heretofore. A horizontal passageway 65 connects the valved opening 64 and a vacuum supply pipe 66.

Actuation of the valve 35 which is normally closed by means of a spring 67 encircling the valve stem 68 is obtained by mechanism including a push rod 69 aligned with said valve stem and so positioned that its outer end is engaged by an arm 70 on the mold carrier section 26ª substantially at the time the two sections of the mold carrier have completely separated and the gathering mold brought into contact with the glass. A locking device designed to hold the valve open and thereby maintain the application of vacuum to the gathering mold until it is desired to deposit the mold charge in one of the press blank molds includes a grooved collar 71 (Figs. 12 and 13) and a pivoted latch 72 normally adapted to engage said collar and to be held in such engagement by means of a coil spring 73. At the proper time an air operated plunger 74ª is actuated by the timer "T to disengage the latch from the collar 71 and allow the valve 35 to close under influence of the spring 67.

In the illustrated form of the invention the gathering mold 25 delivers mold charges to two mold groups, each consisting of a press blank mold 74 and a finishing mold 75 both of these molds being disposed at the same level and adapted to be brought one at a time into register with and below a neck mold unit 76 and press plunger unit 77. The press blank mold 74 (Figs. 2 and 7) is formed with an upwardly opening cavity 78 into which mold charges are deposited by the charge gathering mold 25. A vertically adjustable holder 79 for the blank mold includes a slide 80 in a slideway 81 which forms a part of a carrier 82 mounted upon a pedestal 83 for oscillation about the vertical axis of the latter. An adjusting screw 84 serves as a means for adjusting the elevation of the holder 79 and mold 74. A roller 82ª on the carrier rides upon a support 82ᵇ which assists in holding the mold in an upright position. Oscillation of the carrier to thereby alternately position the blank mold beneath the gathering mold 25 and neck mold unit 76 is obtained by mechanism including a sector rack bar 85 near the lower end of the carrier 82 meshing with a pinion 86 at the upper end of a shaft 87, the lower end of which carries a pinion 88 meshing with a horizontal rack bar 89 in the base 30. A horizontal piston motor 90 (Fig. 7) is adapted to reciprocate the rack bar for the purpose stated.

When the press blank mold arrives at the combined pressing and blank transferring station "S" below and in register with one of a pair of neck mold units 76, the latter is moved downwardly into engagement with the upper end of the mold by means of an air operated piston motor 91 (Fig. 1). This neck mold unit (Figs. 1, 2, 3 and 7) is of conventional form and includes two separable sections 92 mounted in horizontally slidable holders 93 which are supported in a main frame 94 or carrier and connected by means of rack bars 95 to the opposite sides of one of a pair of pinions 96, one of which meshes with a vertical rack bar 97 projecting downwardly from a vertical piston motor 98, operation of which reciprocates said rack bars and through them alternately opens and closes the neck mold. The frame 94 (Figs. 1, 3) is mounted upon a vertical slide 99 in slideways 100 on one of the corner posts 29, said slide being connected to an extension 101 of the piston rod of the motor 91.

The press plunger unit (Figs. 3, 8 and 9) which is lowered for cooperation with the neck and press blank molds in completing the blank or parison and compacting the blank immediately following or simultaneously with engagement between the neck and blank molds, preferably is constructed as follows. A plunger guide ring 102 is formed with a pair of diametrically opposed arms 103 having a pair of fingers 104 at their outer ends designed for engagement with the lower headed ends of a pair of vertical rods 105 depending from and slidingly connected to a cross-head 106. A bar 107 having vertical guide openings at its ends connects the pair of vertical rods 105. Coil springs 108 encircling said rods 105 exert downward pressure on the ends of the bar 107 and secure the arms on the plunger guide rings against premature rotary movement with respect to said rods. A plunger 109 within the plunger guide ring 102 is connected to the lower end of a plunger rod 110 which extends upwardly through an opening 111 at the upper end of said ring. This rod is separably connected to the lower end of a push rod 112 which extends through the cross-head 106. This push rod 112 extends axially upward through a weight cylinder 113 which is mounted for vertical sliding movement in a guide sleeve 114. This guide sleeve 114 is mounted upon a horizontal slide 114ª arranged in slideways 114ᵇ on one of the girders 28 and suitably connected to a horizontal piston motor 114ᶜ, operation of which periodically places the plunger unit in register with the neck mold unit 76. Removable weights 115 in the cylinder 113 function to apply pressure to the plunger 109 after both the plunger and weights, together with the weight cylinder 113 have been lowered a predetermined distance by the piston motor 116. This piston motor operates through rack bars 117 (one of which is fixed to the weight cylinder 113) and pinions 118 in imparting movement to said weight cylinder and plunger. Air under pressure is supplied to the opposite ends of the motor in alternation through pipes 119 which may well lead to the timer "T". Operation of the motor 116 is so controlled by the timer "T" that it lowers the plunger 109 and plunger guide ring 102 into position for cooperation with the press blank and neck molds and at this point discontinues functioning as a means for lowering the plunger, leaving this function entirely to the weights 115. The number of weights in the cylinder 113 is determined by the nature and amount of glass to be compacted.

Upon completion of the blank forming and compacting operation which incidentally forces portions of the glass into the neck mold 92 and thereby attaches the blank to the latter, the plunger and neck mold units are moved upwardly relative to the press blank mold. Thus the blank or parison "P" is removed from the blank mold substantially as shown in Fig. 7. The blank mold is then moved about the axis of the pedestal 83 to the charge delivery station "D" and the finishing mold 75 is brought to the combined pressing and transferring station "S" in register with and below the blank or parison.

This finishing mold 75 may well be of the form shown in my copending application above identified and form a part of a finishing mold unit including a carrier 119ª mounted upon a pedestal 120 on the base 30, said carrier designed for oscillation about the axis of said pedestal by means including a rack bar 121 suitably connected to a piston motor 122 on the base 30 substantially as in said copending application. The finishing mold consists of two sections connected by links to a pair of mold arms 123 which in turn are connected through levers 124 (Figs. 6, 7) to a slide block 125. A bell crank lever 126 connects said slide block and the piston rod 127 of a motor 128, operation of which alternately opens and closes said mold.

Figure 6:
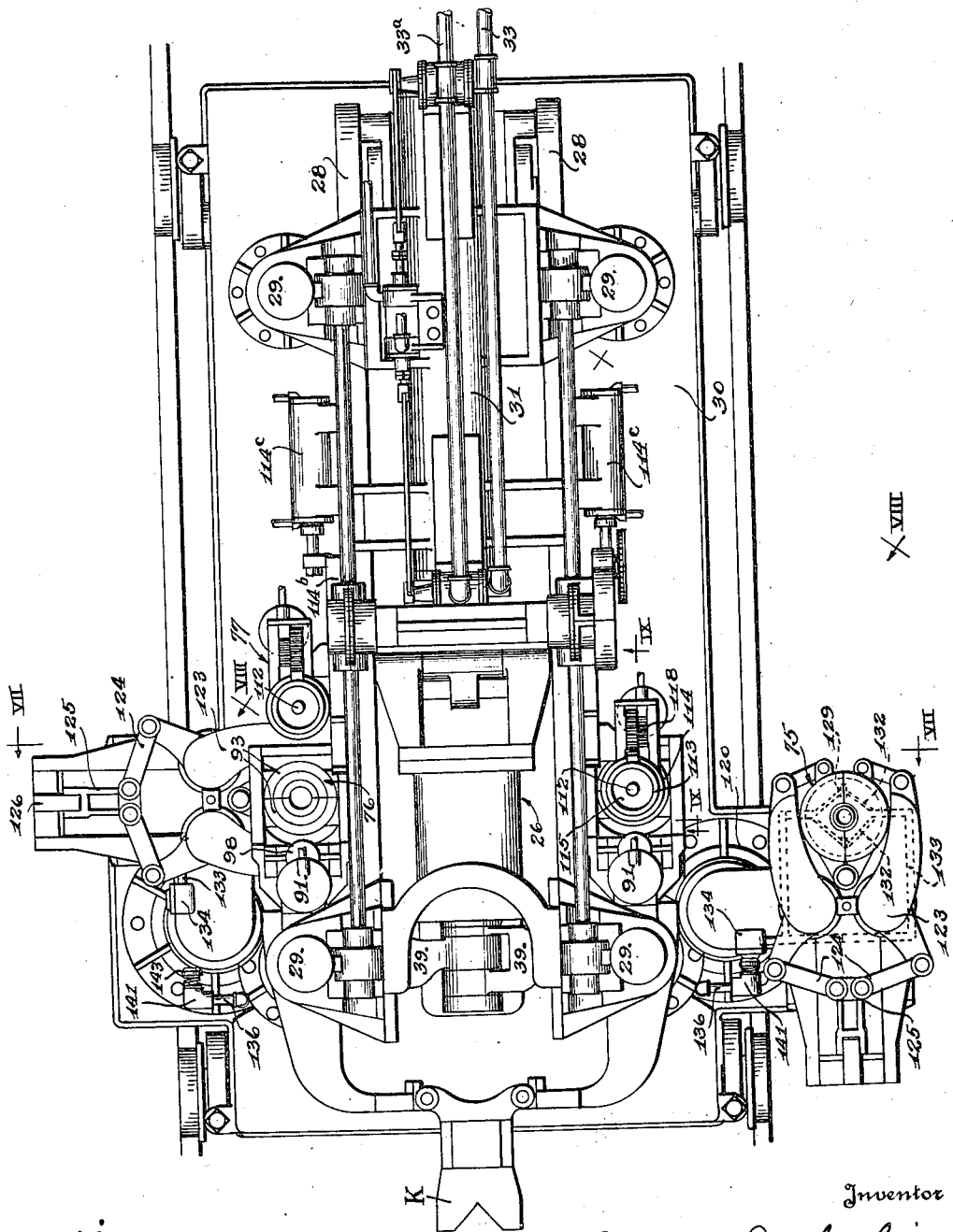
Fig. 6 is a top plan view of the machine.

Prior to closing of the finishing mold at the pressing and transferring station "S" the neck mold is lowered to such a position that the blank is disposed between the halves of the finishing mold, the latter being then closed and the neck mold opened shortly thereafter. The motor 122 then operates to move the finishing mold carrier 119 to the position shown in the lower left hand corner of Fig. 6 and results in establishing communication between the finishing mold cavity and a source of supply of vacuum, whereby the blank or parison is expanded to its final form. The specific construction for accomplishing such final expansion includes vacuum grooves 129 or slots (Figs. 5 and 6) in the meeting faces of the finishing mold sections, said slots communicating at their lower ends with matched annular channels 130 in the lower ends of the finishing mold sections and upper surface of the bottom mold plate holder 131, the latter channels communicating through conduits 132 with pipes 133. These pipes 133 are directly connected to a chamber 134 forming part of a readily separable coupling 135 by means of which connection between said pipes 133 and the main supply pipe 136 may be quickly effected. This coupling (Fig. 5) includes a valve member 137 consisting of a hollow stem 138 having a pair of oppositely directed ports 139 at its inner end normally closed by a plug 140 which is threaded into a chamber 141. A coil spring 142 encircling the stem between said chamber 141 and a head 143 on said stem yieldingly holds the valve member in position to close said ports 139. Positioning of the finishing mold unit at the blank expanding station "F" as indicated in Figs. 6 and 7 operates to move the valve member 137 sufficiently to establish communication between the pipes 133 and 136 with the result that vacuum is applied to the mold cavity and the blank or parison expanded to its final form. While this valve 137 partly regulates and controls application of vacuum to the corresponding finishing mold, the main control is effected by the timer "T" which provides for application of vacuum up to the valve 137 just in advance of completion of the movement of the finishing mold unit to the final blowing and article removing station "F".

In operation, the ram 26 is projected and at a predetermined point the two sections separate, the lower section moving substantially vertically downward to bring the gathering mold 25 into contact with the supply body "G" of molten glass, as in Fig. 15. Vacuum is applied to the mold cavity and thereby causes delivery of a measured quantity of glass to the cavity 57. The ram is then retracted causing movement of the lower end of the mold over a cut-off knife "K" and consequent removal of excess glass from the lower end of the gathered mold charge. When the gathering mold reaches the charge delivery station "D" it is opened (the application of vacuum having been discontinued by closing of the valve 35) and the mold charge is allowed to drop into the press blank mold 74. This press blank mold is then brought to the combined pressing and blank transferring station "S". The neck mold unit 76 is then lowered into engagement with the press blank mold and the press plunger unit 77 is moved horizontally into register with the neck mold unit and then lowered for the purpose of compacting the glass and forcing portions thereof into the neck mold. The press plunger unit and neck mold unit are then moved relative to the press blank mold, said neck mold unit carrying with it the completely formed blank or parison. Following this the blank mold is again moved to the charge delivery station "D" and the finishing mold 75 is brought into register with and below the blank or parison. The neck mold is again lowered sufficiently to place the blank between the finishing mold sections which are then brought together about the parison. The neck mold is then opened and moved upwardly away from the finishing mold. The air motor 122 operates to move the finishing mold to the article expanding and removing station "F" where vacuum is applied to the cavity for expanding the blank. Thereafter, the application of vacuum is discontinued and the mold opened preparatory to removal of the finished article from said mold.

Modifications may be resorted to within the spirit and scope of the appended claims.

What I claim is:

1. The combination of a blank mold having an upwardly facing cavity, means for moving the blank mold between a charging station and a combined blank forming and transferring station, a neck mold and press plunger unit adapted to be brought into cooperative relation to the blank mold at said blank forming and transferring station whereby the mold charge is transformed into a blank and attached to the neck mold, means for effecting separation of the blank and blank mold, a partible finishing mold disposed at the same elevation as the blank mold, means for moving said mold horizontally between said blank forming and transferring station and a blank expanding station, means for closing the mold about the blank at the transferring station, a source of supply of vacuum, and means whereby movement of the finishing mold to the blank expanding station automatically effects communication between the interior of the mold and the source of supply of vacuum and causes expansion of the blank.

2. The combination of a blank mold having an upwardly facing cavity, means for moving the mold between a charge delivery station and a combined blank forming and transferring station, means for delivering a mold charge of molten glass to the mold at said delivery station, a partible neck mold, means for bringing said neck mold into engagement with the upper end of the blank mold at the blank forming and transferring station, a plunger, means for projecting the plunger into the neck and blank molds and thereby forming a blank and attaching it to the neck mold, means for effecting relative movement between the blank and neck molds to remove the blank from said blank mold, a finishing mold, means for closing the finishing mold about said blank at the transferring station, means for moving the finishing mold with the blank therein to a blank expanding station, a source of vacuum supply, and means whereby movement of the finishing mold to the blank expanding station effects communication between the mold and said source of supply of vacuum and expands the blank.

3. The combination of a blank mold and finishing mold arranged at the same elevation and mounted for oscillation about separate vertical axes whereby they are brought one at a time to a blank forming and transferring station, means for delivering a mold charge of molten glass to the blank mold at a charge delivery station, means for transforming the mold charge into a blank and transferring it to the finishing mold at said blank forming and transferring station, means for oscillating said molds and thereby periodically positioning the finishing mold at a blank expanding and article removing station, and means for expanding the blank in said finishing mold.

4. The combination of blank and finishing molds arranged at the same elevation and mounted for oscillation about separate vertical axes whereby the molds are brought one at a time to a combined blank forming and transferring station, means for delivering a mold charge of molten glass to the blank mold at a charge delivery station, means for transforming the mold charge into a blank and transferring it to the finishing mold at said blank forming and transferring station, means for oscillating said molds and thereby periodically positioning the finishing mold at a blank expanding and article removing station, a source of supply of vacuum, and means whereby movement of the finishing mold to the blank expanding station effects communication between the interior of the finishing mold and said source of supply of vacuum.

5. The combination of a suction gathering mold, means for moving it between a charge gathering and charge delivery station, a pair of blank molds mounted for oscillation about vertical axes disposed at opposite sides of the path of movement of the gathering mold, means for oscillating the blank molds to bring them one at a time to the charge delivery station, means for operating the gathering mold to effect delivery of mold charges to said blank molds, oscillation of the blank molds also bringing them one at a time to combined blank forming and transferring stations at opposite sides of said path of travel of the gathering mold, means including a neck mold and press plunger at said blank forming and transferring stations for transforming the mold charges into blanks and attaching them to the corresponding neck molds, means for effecting removal of the blank from the blank molds, a finishing mold unit at each side of the path of travel of the charge gathering mold, means for closing the finishing molds about blanks at said blank forming and transferring stations, and means for expanding the blanks in said finishing molds.

6. A glassware forming machine comprising a partible suction type charge gathering mold, a ram supporting said mold, means for reciprocating the ram to move said mold between horizontally spaced charge gathering and charge delivery stations, means for applying vacuum to the mold at the charge gathering station and during at least a portion of its movement to the charge delivery station, means for opening the mold at the charge delivery station to discharge a mold charge of glass, a blank mold and a finishing mold disposed at the same elevation and mounted for oscillation about adjacent but separate vertical axes at one side of the path of travel of the gathering mold whereby they are brought one at a time to a combined blank forming and transferring station at one side of the path of travel of the ram and charge gathering mold, means for oscillating the blank mold whereby it is periodically placed below and in register with the charge gathering mold at the charge delivery station, means for transforming the mold charge into a blank and transferring the blank to the finishing mold at the blank forming and transferring station, means for moving the finishing mold to a blank expanding station, and means for expanding the blank at the latter station.

7. A glassware forming machine comprising a partible suction type charge gathering mold, a ram supporting said mold, means for reciprocating the ram to thereby move said mold between horizontally spaced charge gathering and charge delivery stations, means for applying vacuum to the mold at the charge gathering station and during at least a portion of its movement to the charge delivery station, means for opening the mold at the charge delivery station to discharge a mold charge of glass, a blank mold and a finishing mold disposed at the same elevation and mounted for oscillation about adjacent but separate vertical axes whereby they are brought one at a time to a combined blank forming and transferring station at one side of the path of travel of the ram and charge gathering mold, means for oscillating the blank mold whereby it is periodically placed below and in register with the charge gathering mold at the charge delivery station to receive a mold charge, means for transforming the mold charge into a blank and transferring the blank to the finishing mold at the blank forming and transferring station, means for moving the finishing mold to a blank expanding station, a source of supply of vacuum, and means whereby movement of the finishing mold to the blank expanding station effects communication between the interior of the finishing mold and said source of supply of vacuum.

8. A glassware forming machine comprising a partible suction type charge gathering mold, a ram supporting said mold, means for reciprocating the ram to thereby move said mold between horizontally spaced charge gathering and charge delivery stations, means for applying vacuum to the mold at the charge gathering station and during at least a portion of its movement to the charge delivery station, means for opening the mold at the charge delivery station to discharge a mold charge of glass, a blank mold and a finishing mold disposed at the same elevation and mounted for oscillation about adjacent but separate vertical axes whereby they are brought one at a time to a combined blank forming and transferring station at one side of the path of travel of the ram and charge gathering mold, means for oscillating the blank mold whereby it is periodically placed below and in register with the charge gathering mold at the charge delivery station to receive a mold charge, means for transforming the mold charge into a blank and transferring the blank to the finishing mold at the blank forming and transferring station, means for moving the finishing mold to a blank expanding station, means for expanding the blank at the latter station, said means for expanding the blank consisting of a source of supply of vacuum, and a valved coupling operable by movement of a finishing mold to the blank expanding station for effecting communication between the mold and source of supply of vacuum.

9. A glassware forming machine comprising a pair of single piece blank molds mounted for oscillation about separate vertical axes whereby they are moved between a charge delivery station common to the molds and blank forming and transferring stations individual thereto, means including a suction type charge gathering mold for depositing mold charges of glass in the blank molds at said charge delivery station, means for transforming the mold charges into blanks at said blank forming and transferring stations, finishing molds individual to the blank molds, means for transferring blanks from the blank molds to the finishing molds, and means for expanding the blanks to their final shape in the finishing molds.

10. A glassware forming machine comprising a pair of single piece blank molds mounted for oscillation about separate vertical axes whereby they are moved between a charge delivery station common to the molds and combined blank forming and transferring stations individual thereto, means including a suction type charge gathering mold for depositing mold charges of glass in the blank molds at said charge delivery station, means for transforming the mold charges into blanks at said blank forming and transferring station, a partible finishing mold associated with each blank mold, means for moving the finishing mold between one of the combined blank forming and transferring stations and a blank expanding station, means for transferring the blanks to the finishing molds, and means for expanding the blanks in the finishing molds at said blank expanding station.

11. A glassware forming machine comprising a pair of single piece blank molds mounted for oscillation about separate vertical axes whereby they are moved between a charge delivery station common to the molds and combined blank forming and transferring stations individual thereto, means including a suction type charge gathering mold for depositing mold charges of glass in the blank molds at said charge delivery station, means for transforming the mold charges into blanks at said blank forming and transferring stations, a partible finishing mold associated with each blank mold, means for moving the finishing molds between the blank forming and transferring stations and blank expanding stations individual thereto, means for transferring blanks to the finishing molds, a source of supply of vacuum, and means operable by movement of the finishing molds to the blank expanding stations for effecting communication between the finishing molds and said source of supply of vacuum.

12. A glassware forming machine comprising a blank mold having an upwardly facing charging opening, means for oscillating the mold about a vertical axis between a charge delivery station and a combined blank forming and transferring station, means for delivering a mold charge of glass to the blank mold at said delivery station, a neck mold in a plane above the blank mold at said blank forming and transferring station, means for moving the neck mold downwardly into engagement with the blank mold, a press plunger above the neck mold, means for moving the press plunger horizontally into register with the blank and neck molds and then downwardly into said molds, said means for effecting movement of the neck mold and press plunger also operating to move them away from the blank mold, a finishing mold, means for closing it about a blank at said blank forming and transferring station, means for moving the finishing mold to a blank expanding station, and means for expanding the blank in the finishing mold.

13. A glassware forming machine comprising a blank mold having an upwardly facing charging opening, means for oscillating the mold about a vertical axis between a charge delivery station and a combined blank forming and transferring station, means for delivering a mold charge of molten glass to the blank mold at said delivery station, a neck mold in a plane above the blank mold at said blank forming and transferring station, means for moving the neck mold downwardly into engagement with the blank mold, a press plunger above the neck mold, means for moving the press plunger horizontally into register with the blank and neck molds and then downwardly into said molds, said means for effecting movement of the neck mold and press plunger also operating to move them away from the blank mold, a partible finishing mold, a carrier for said finishing mold, means for oscillating the carrier about a vertical axis to thereby alternately position the finishing mold at the combined blank forming and transferring station and a blank expanding station, and means for effecting expansion of the blank in said finishing mold.

14. A glassware forming machine comprising a blank mold having an upwardly facing charging opening, means for oscillating the mold about a vertical axis between a charge delivery station and a combined blank forming and transferring station, means for delivering a mold charge of glass to the blank mold at said delivery station, a neck mold in a plane above the blank mold at said blank forming and transferring station, means for moving the neck mold downwardly into engagement with the blank mold, a press plunger above the neck mold, means for moving the press plunger horizontally into register with the blank and neck molds and then downwardly into said molds, said means for effecting movement of the neck mold and press plunger also operating to move them away from the blank mold, a partible finishing mold, a carrier for said finishing mold, means for oscillating the carrier about a vertical axis to thereby alternately position the finishing mold at the blank forming and transferring station and a blank expanding station, a source of supply of vacuum, a coupling including a valve, and means whereby movement of the finishing mold carrier to the blank expanding station opens the valve and effects communication between the source of supply of vacuum and the finishing mold.

LEONARD D. SOUBIER.